(12) United States Patent
Duecoffre et al.

(10) Patent No.: US 6,258,874 B1
(45) Date of Patent: Jul. 10, 2001

(54) BINDER AGENT COMPOSITION, COATING AGENTS CONTAINING THEM, THEIR PRODUCTION AND USE

(75) Inventors: Volker Duecoffre; Walter Schubert, both of Wuppertal (DE)

(73) Assignee: Herberts GmbH & Co. KG, Wuppertal (DE)

( * ) Notice: Subject to any disclaimer, the term of this patent is extended or adjusted under 35 U.S.C. 154(b) by 0 days.

(21) Appl. No.: 09/331,098

(22) PCT Filed: Dec. 12, 1997

(86) PCT No.: PCT/EP97/06979

§ 371 Date: Jun. 14, 1999

§ 102(e) Date: Jun. 14, 1999

(87) PCT Pub. No.: WO98/27176

PCT Pub. Date: Jun. 25, 1998

(30) Foreign Application Priority Data

Dec. 14, 1996 (DE) ............................................... 196 52 145

(51) Int. Cl.$^7$ ............................ C08L 63/00; C08L 75/00; B05D 3/02
(52) U.S. Cl. ........................... 523/414; 524/591; 525/107; 525/208; 427/386; 427/407.1
(58) Field of Search ........................... 523/414; 524/591; 525/107, 208; 427/386, 407.1

(56) References Cited

U.S. PATENT DOCUMENTS

| 4,220,568 | * | 9/1980 | Patzschke | 528/296 |
|---|---|---|---|---|
| 5,087,646 | * | 2/1992 | Tork et al. | 523/406 |
| 5,326,832 | * | 7/1994 | Belder et al. | 525/438 |
| 5,686,532 | * | 11/1997 | Bederke et al. | 525/222 |
| 5,710,208 | * | 1/1998 | Bederke et al. | 524/513 |

* cited by examiner

Primary Examiner—Tae H. Yoon
(74) Attorney, Agent, or Firm—Pillsbury Winthrop LLP

(57) ABSTRACT

This invention relates to a binder composition suitable for coating compositions, which binder composition contains one or more carboxy-functional polymers, one or more compounds having an epoxide function in the molecule, one or more polyols having at least two hydroxyl functions in the molecule, which polyols differ from a component A) optionally containing hydroxyl functions, components which crosslink with hydroxyl groups to form ethers and/or a triazine-based crosslinking agent, optionally one or more polyisocyanates, which may optionally be capped, optionally an anhydride component and optionally one or more catalysts for catalysing the reaction of carboxyl and epoxide groups.

8 Claims, No Drawings

BINDER AGENT COMPOSITION, COATING AGENTS CONTAINING THEM, THEIR PRODUCTION AND USE

FIELD OF THE INVENTION

This invention relates to binder compositions having a very high working solids content which are suitable for the production of coating compositions which are stoved at elevated temperature and in particular are suitable for the production of multilayer lacquer coatings, for example in the automotive sector.

BACKGROUND OF THE INVENTION

DE-A-30 22 996 discloses a stoving lacquer, in which polymers containing carboxyl groups, such as for example acrylates based on acrylic acid or methacrylic acid, and acrylates containing glycidyl groups are mixed together to yield a curable composition.

WO 84/00771 describes a multicomponent system in which four types of binders are mixed together and then applied. The components comprise acrylate containing hydroxyl groups, acid anhydride, wherein at least 50% are alkylhexahydrophthalic anhydrides, epoxy resin and melamine resin. The systems have an elevated solids content.

DE-A-23 33 384 describes a binder based on acrylated polyesters, which are obtained by polymerising an acrylate containing hydroxyl groups in a polyester or alkyd resin containing hydroxyl groups. Crosslinking may be performed with melamine resins and simultaneously epoxy resins.

Some of the known coating compositions give rise to films having elevated hardness and good resistance to weathering. However, they do not satisfy the constantly increasing requirements for elevated resistance to acids and solvents. Moreover, they do not meet the requirement for a very high working solids content.

SUMMARY OF THE INVENTION

The object of the invention is to provide coating compositions having an elevated working solids content which are suitable for coatings having elevated hardness and improved resistance to weathering, acids and solvents.

It has been found that this object may be achieved by a binder composition, which is provided by the invention and contains:

A) 30 to 80 wt. % of one or more carboxy-functional polymers, the carboxyl functionality of which in each case corresponds to an acid value of 15 to 300 mg of KOH/g, B) 3 to 30 wt. % of one or more compounds having an epoxide function in the molecule, C) 0 to 60 wt. % of one or more polyols having at least two hydroxyl functions in the molecule, which differ from a component A) optionally containing hydroxyl functions, D) 0 to 40 wt. % of components which crosslink with hydroxyl groups to form ethers and/or a triazine-based crosslinking agent, E) 0 to 40 wt. % of one or more polyisocyanates, which may optionally be capped, F) 0 to 60 wt. % of an anhydride component consisting of at least one organic polyanhydride having at least two cyclic carboxylic anhydride groups per molecule, G) 0 to 10 wt. % of one or more catalysts for catalysing the reaction of carboxyl and epoxide groups, wherein the sum of weight percentages of components A) to G) adds up to 100 wt. % and wherein at least 10 wt. % of the binder composition consists of one or more of components D), E) and/or F).

This invention also relates to coating compositions which may be produced from the binder compositions according to the invention. These coating compositions may comprise aqueous and/or solvent-containing coating compositions, which may optionally contain pigments, extenders and/or conventional lacquer auxiliary substances and additives; they may also be formulated as powder coatings containing neither solvent nor water.

Various compounds may be used as the carboxy-functional polymer A). These comprise the conventional resins having carboxyl groups which may be used in lacquers. For example, (meth)acrylic copolymers, polyesters, polyester/(meth)acrylic copolymers or mixtures thereof, which are carboxy-functional and optionally contain hydroxyl groups and optionally urethane groups, may be used. Poly(meth)acrylic polyols, polyester polyols, polyester/(meth)acrylic polyols, polyurethane polyols or mixtures thereof, which are carboxy-functional and optionally contain urethane groups, are, for example, suitable.

When producing (meth)acrylic copolymers or polyester/(meth)acrylic copolymers usable as component A) which contain carboxyl groups and optionally in each case contain urethane groups, the carboxyl groups may be introduced directly by using structural units containing carboxyl groups, for example during the synthesis of polymers, such as (meth)acrylic copolymers. Examples of monomers containing carboxyl groups suitable for this purpose are unsaturated carboxylic acids, such as for example acrylic, methacrylic, itaconic, crotonic, isocrotonic, aconitic, maleic and fumaric acid, semi-esters of maleic acid and fumaric acid, as well as carboxyalkyl esters of (meth)acrylic acid, for example β-carboxyethyl acrylate and addition products of hydroxyalkyl esters of acrylic acid and/or methacrylic acid with carboxylic anhydrides, such as for example phthalic acid mono-2-(meth)acryloyloxyethyl ester.

The term (meth)acrylic is used in the present description and the patent claims. The term means acrylic and/or methacrylic.

When producing (meth)acrylic copolymers or polyester/(meth)acrylic copolymers containing carboxyl groups and optionally containing urethane groups, it is, however, also possible initially to synthesise a polymer containing hydroxyl groups and optionally also already carboxyl groups having an OH value of 15 to 300 mg of KOH/g and to introduce the carboxyl groups wholly or in part in a second stage by reaction with carboxylic anhydrides. Using this method, it is possible to operate with quantity ratios such that sufficient OH groups optionally remain in order to be able to perform urethanisation or in order to allow crosslinking with components D) to F).

Carboxylic anhydrides suitable for addition onto the polymers which contain hydroxyl groups and may optionally also already contain carboxyl groups are the anhydrides of aliphatic, cycloaliphatic and aromatic saturated and/or unsaturated di- and polycarboxylic acids, such as for example the anhydrides of phthalic acid, tetrahydrophthalic acid, hexahydrophthalic acid, succinic acid, maleic acid, itaconic acid, glutaric acid, trimellitic acid and pyromellitic acid, as well as the halogenated or alkylated derivatives thereof.

Anhydrides of phthalic acid, tetrahydro- and hexahydrophthalic acid as well as 5-methylhexahydrophthalic anhydride are preferably used.

Monomers suitable for introducing hydroxyl groups into the (meth)acrylic copolymers or polyester/(meth)acrylic copolymers optionally containing urethane groups are, for example, hydroxyalkyl esters of α,β-unsaturated carboxylic acids, such as (meth)acrylic acid, for example having primary hydroxyl groups, such as for example hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. Examples of usable hydroxyalkyl esters having a secondary hydroxyl group which may be mentioned are 2-hydroxypropyl acrylate, 2-hydroxybutyl acrylate, 3-hydroxybutyl acrylate and the corresponding methacrylates. These hydroxyalkyl esters are, for example, also suitable for the production of the addition products with carboxylic anhydrides described for the synthesis of component A).

The hydroxy-functionalised component may advantageously at least in part comprise a reaction product of 1 mol of hydroxyethyl acrylate and/or hydroxyethyl methacrylate and on average 2 mol of α-caprolactone.

A reaction product prepared from acrylic acid and/or methacrylic acid with the glycidyl ester of a carboxylic acid having a tertiary α-carbon atom may also be used at least in part as the hydroxy-functionalised component. Glycidyl esters of highly branched monocarboxylic acids are obtainable, for example, under the trade name "Cardura". The acrylic acid or methacrylic acid may react with the glycidyl ester of a carboxylic acid having a tertiary αcarbon atom before, during or after the polymerisation reaction.

Apart from the above-stated monomers, further ethylenically unsaturated monomers may also be used for the production of the (meth)acrylic copolymers. Selection of the further ethylenically unsaturated monomers is not critical; the olefinic monomers with or without further functional groups conventional for polymerisation may be used. The monomers are preferably selected in the manner familiar to the person skilled in the art such that the incorporation thereof does not give rise to unwanted copolymer properties.

Examples of further ethylenically unsaturated monomers which are suitable are in particular alkyl esters of acrylic and methacrylic acid, such as for example methyl (meth) acrylate, ethyl (meth)acrylate, propyl (meth)acrylate, butyl (meth)acrylate, isopropyl (meth)acrylate, isobutyl (meth) acrylate, pentyl (meth)acrylate, hexyl (meth)acrylate, cyclohexyl (meth)acrylate, 2-ethylhexyl (meth)acrylate, octyl (meth)-acrylate, 3,5,5-trimethylhexyl (meth)acrylate, decyl (meth)acrylate, dodecyl (meth)acrylate, hexadecyl (meth) acrylate, octadecyl (meth)acrylate and octadecenyl (meth) acrylate. Silane-modified monomers may also be used, such as for example γ-methacryloxypropyltrimethoxysilane or γ-methacryloxypropyl-tris(2-methoxyethoxy)silane.

Further ethylenically unsaturated monomers may be used for the production of (meth)acrylic copolymers instead of the above-stated alkyl esters of acrylic and methacrylic acid or together with these alkyl esters, wherein the selection of these monomers is largely determined by the desired properties of the coating compositions with regard to hardness, resilience, compatibility and polarity.

Examples of further, suitable ethylenically unsaturated monomers are the alkyl esters of maleic, fumaric, tetrahydrophthalic, crotonic, isocrotonic, vinylacetic and itaconic acid, such as for example the corresponding methyl, ethyl, propyl, butyl, isopropyl, isobutyl, pentyl, amyl, isoamyl, hexyl, cyclohexyl, 2-ethylhexyl, octyl, 3,5,5-trimethylhexyl, decyl, dodecyl, hexadecyl, octadecyl and octadecenyl esters.

Small proportions of monomers having at least two polymerisable, olefinically unsaturated double bonds may furthermore also be used. The proportion of these monomers is preferably below 5 wt. %, relative to the total weight of the monomers.

Examples of such compounds are hexanediol diacrylate, hexanediol dimethacrylate, ethylene glycol diacrylate, ethylene glycol dimethacrylate, butanediol diacrylate, butanediol dimethacrylate, hexamethylene bismethacrylamide, trimethylolpropane triacrylate, trimethylolpropane trimethacrylate and similar compounds.

Monovinyl aromatic compounds comprise another suitable component. They preferably contain 8 to 9 carbon atoms per molecule. Examples of suitable compounds are styrene, vinyltoluene, a-methylstyrene, chlorostyrene, o-, m- or p-methylstyrene, 2,5-dimethylstyrene, p-methoxystyrene, p-tert.-butylstyrene, p-dimethylaminostyrene, p-acetamidostyrene and m-vinylphenol. Vinyltoluenes are preferably used, as is in particular styrene.

The copolymeric binder component A) is produced by free-radical copolymerisation. The quantity of monomers is here adjusted such that the desired specifications with regard to molecular weight, OH value and acid value are achieved. It may prove advantageous in this connection to apportion part of the monomers with a time delay relative to the remainder. The number average molecular weight (Mn) is for example 1000 to 20000, which also for example applies to corresponding urethanised products.

In order to produce the copolymers, the monomers or the monomer mixture used may contain initiators. Where initiators are not present in the monomer mixture, they may be added to the monomer mixture optionally with a slight time delay or be apportioned separately. Post-polymerisation may then additionally be performed over a relatively long period of time, for example for two or more hours. It is then possible to establish a desired solids content, for example of the order to 30 to 60 wt. %, for example of 50 wt. %, with a conventional lacquer solvent.

Production proceeds, for example, as free-radical solution polymerisation in the presence of a free-radical initiator, as is familiar to the person skilled in the art. Examples of free-radical initiators are dialkyl peroxides, diacyl peroxides, hydroperoxides, peresters, peroxydicarbonates, perketals and azo compounds, as well as C—C cleaving initiators.

The polymerisation initiators are generally used, for example, in a quantity of 0.1 to 4 wt. %, relative to the initial weight of monomers.

In a further reaction step, the carboxy-functionalised (meth)acrylic copolymers may possibly be urethanised by reacting OH functions of the carboxy-functionalised (meth) acrylic copolymers with mono-, di-, tri- or polyisocyanates. The quantity of di-, tri- or polyisocyanates is dependent upon the OH value of the (meth)acrylic copolymer and is selected in a manner familiar to the person skilled in the art such that gelation is avoided. For example, copolymers having an OH value of 30 to 100 mg of KOH/g are reacted with di-, tri-or polyisocyanates in such a manner that an OH value of the urethanised copolymer of 15 to 80 mg of KOH/g is obtained. The method used may be that the carboxy- and OH-functional (meth)acrylic copolymer is initially introduced as a solution in an aprotic solvent and the di-, tri- or polyisocyanate, optionally dissolved in an aprotic solvent such as for example xylene or butyl acetate, is then apportioned in a period of for example 30 minutes to 3 hours, for example at 5° C. to 80C. The reaction is complete once the NCO value of the reaction mixture is less than 0.1. When monoisocyanates are used, no specific quantity of isocyanate is necessary; in this case, all the OH functions of the (meth)acrylic copolymer may optionally be reacted. The reaction conditions are the same as for di-, tri- or polyisocyanates. OH-functional (meth)acrylic copolymers may, of course, also be urethanised before introduction of carboxyl groups by reaction with acid anhydrides and only subsequently is the acid attached. Examples of di-, tri-and polyisocyanates, which may also be used as a mixture, are stated in the description of component E).

Examples of monoisocyanates are, for example, reaction products of the diisocyanates described below for component E) with monoalcohols such as methanol, butanol, hexanol or octanol, wherein 1 mol of diisocyanate is reacted with 1 mol of alcohol. Further examples of monoisocyanates are α,α-dimethyl-m-isopropenylbenzyl isocyanate or isocyanatoacrylate.

The polyesters containing carboxyl groups and optionally containing urethane groups usable as component A) may be synthesised using conventional methods from aliphatic and/or cycloaliphatic di-, tri- or more highly hydric alcohols, optionally together with monohydric alcohols and from aliphatic, aromatic and/or cycloaliphatic carboxylic acids, in particular dicarboxylic acids, together with more highly functional polycarboxylic acids. Examples of suitable alcohols are aliphatic diols, such as ethylene glycol, 1,2-propanediol, 1,3-propanediol, 2,2-dimethyl-1,3-propanediol, 1,2-butanediol, 1,3-butanediol, 1,4-butanediol, 1,5-pentanediol, 3-methyl-1,5-pentanediol, 1,6-hexanediol, 2-ethyl-1,6-hexanediol, 2,2,4-trimethyl-1,6-hexanediol, 1,4-dimethylolcyclohexane, polyhydric aliphatic alcohols, such as glycerol, trimethylolethane, trimethylolpropane, pentaerythritol, as well as etherification products of diols and polyols, for example di- and triethylene glycol, polyethylene glycol, neopentyl glycol ester of hydroxypivalic acid.

Examples of suitable carboxylic acids are adipic, azelaic, 1,2- and 1,3- and 1,4-cyclohexanedicarboxylic acid, tetrahydrophthalic, hexahydrophthalic, endomethylenetetrahydrophthalic acid, isophthalic acid, o-phthalic acid, terephthalic acid or the anhydrides thereof as well as the esterifiable derivatives thereof.

The calculated molecular weights of the polyesters are preferably between 500 and 5000 g/mol.

The carboxy-functional polymer usable as component A) preferably has a glass transition temperature of for example −20 to 50° C., preferably of 0 to 35° C., particularly preferably of 5 to 25° C.

The carboxy-functional polymers usable as component A), in particular the (meth)acrylic copolymers and polyesters usable for this purpose may at least in part be reacted or "chain-extended" with a lactone. The expression "chain-extended" here relates to the position of the carboxyl group, which is no longer located directly on the polymer or polyester skeleton, but is instead linked therewith via a chain originating from the lactone. A partial reaction is preferably taken to mean a reaction in which at least 10% of the carboxyl groups are reacted with lactone. The lactones (cyclic esters) attach themselves to carboxyl groups, wherein the ring is opened and a new terminal carboxyl group is formed. Since, when OH and COOH groups are present, the OH groups react substantially faster with lactones, carboxy-functional (meth)acrylic copolymers and carboxy-functional polyesters containing no OH groups are preferred for the production of component A). If copolymers or polyesters containing OH groups are used as the starting materials, the OH groups thereof are preferably entirely or largely reacted with anhydrides to yield carboxylic acids. One example of a particularly preferred lactone is ε-caprolactone.

The reaction with the lactone may, for example, proceed immediately after resin synthesis, i.e. after synthesis of the (meth)acrylic copolymer or the polyester. The reaction proceeds, for example, at elevated temperature, for example at temperatures of up to 100° C. The reaction may be performed, for example, with stirring, for example for up to 10 hours.

Like the carboxy-functionalised (meth)acrylic copolymers already described, the carboxy-functionalised polyesters may also be urethanised. The reaction conditions and the polyisocyanates which may be used are the same as for the (meth)acrylic copolymers. It is possible to introduce the urethane groups 1) by reacting the carboxy- and OH-functional polyesters; 2) by reacting the lactone-modified carboxy-functional and OH-functional polyesters with mono-,di- or tri- or polyisocyanates. It is preferred to react carboxy- and OH-functional polyesters with polyisocyanates before lactonisation. It is possible here to urethanise a large part or the entirety of the OH groups, such that in the case of the lactone reaction these OH groups are no longer able to enter into competing reactions with carboxyl groups.

It is also possible to introduce the urethane groups during polyester synthesis itself. This proceeds by di- or tricarboxylic acids being entirely or partially exchanged with di- or triisocyanates.

The above stated routes 1) and 2) are preferred, with route 1) being particularly preferred. Examples of usable mono-, di-, tri- or polyisocyanates are stated below in the description of component E).

The binder composition according to the invention or the coating compositions according to the invention may contain one or more polyols having at least two hydroxyl functions in the molecule as component C), wherein component C) differs from a component A) optionally containing hydroxyl functions. Component C) preferably comprises polymeric polyols, which may also bear carboxyl groups if A) bears no hydroxyl groups. The polymeric polyols may, for example, be selected from among the hydroxy-functional polyester polyols and poly(meth)acrylic polyols stated in the description of the production of A). Component C) may also be urethanised as described above.

It is also possible to synthesise the binder A) as a graft on the binder C) or vice versa.

To this end, it is for example possible initially to introduce a proportion or all of the component C) polyol optionally with one or more organic solvents and to react therein the monomers, or a proportion thereof, which are required for the production of the carboxy-functional component A). For example, the polyols C) may initially be introduced, optionally with solvent, and heated, for example to temperatures of the order of 140° C. The monomers required for the production of the carboxy-functional component A) may be apportioned, optionally together with initiators, for example within a period of up to 5 hours. The polyol component C) used in this method is preferably a polyester polyol, in particular one having a number average molecular weight Mn of 500 to 5000, preferably having an acid value of below 15 mg of KOH/g and preferably having an OH value of 15 to 300 mg of KOH/g. Such a graft polymer of A) and C) may have advantages over a mixture of A) and C), such as for example better compatibility and more homogeneous mixing.

The binder composition according to the invention or the coating compositions according to the invention may contain as component D) a crosslinking agent which reacts with hydroxyl groups to form ethers. These comprise, for example, one or more melamine resins. Examples of these are water-insoluble butanol- or isobutanol-etherified melamines, such as for example the commercial products Setamin® US 138 or Maprenal® MF 610; co-etherified melamines, which are etherified with both butanol and methanol, such as for example Cymel® 254, together with hexamethyloxymethyl-melamine (HMM melamines), such as for example Cymel® 301 or Cymel® 303, wherein an acid catalyst, such as for example p-toluenesulphonic acid, may be added to the latter for crosslinking.

Further examples of melamine resin crosslinking agents are conventional hydrophilic and thus water-soluble or water-compatible melamine resins, such as for example methyl etherified melamines, such as for example Cymel® 325, Cymel® 327, Cymel® 350 and Cymel® 370, Maprenal® MF 927.

The binder compositions and coating compositions according to the invention may also contain a triazine-based crosslinking agent as the crosslinking component D). One example thereof is a triazine triscarbamate of the general formula

R may here be an alkyl residue having 1 to 20 C atoms, an aryl residue having 6 to 20 C atoms and/or an aralkyl residue having 7 to 20 C atoms. The residues R may be identical or different.

Specific examples of these carbamate crosslinking agents are 2,4,6-tris(methoxycarbonylamino)-1,3,5-triazine and 2,4,6-tris(butoxycarbonylamino)-1,3,5-triazine.

The coating compositions according to the invention may contain one or more free or capped polyisocyanates as crosslinking agents (component E) which form urethane groups with OH groups. Examples of usable polyisocyanates are cycloaliphatic, aliphatic or aromatic polyisocyanates, such as tetramethylene diisocyanate, hexamethylene diisocyanate, 2,2,4-trimethylene diisocyanate, 1,12-dodecane diisocyanate, 1,3- and 1,4-cyclohexane diisocyanate, isophorone diisocyanate, perhydro-2,4'-and/or -4,4'-diphenylmethane diisocyanate, 1,3- and 1,4-phenylene diisocyanate, 2,4- and 2,6-tolylene diisocyanate, 2,4'- and/or 4,4'-diphenyl-methane diisocyanate, 3,2'-and/or 3,4-diisocyanato-4-methyldiphenylmethane, 1,5-naphthylene diisocyanate, 4,4',4"-triphenylmethane triisocyanate, tetramethylxylylene diisocyanate or mixtures of these compounds.

In addition to these simple isocyanates, those containing heteroatoms in the isocyanate group linking residue are also suitable. Examples of these are polyisocyanates containing carbodiimide groups, allophanate groups, isocyanurate groups, urethane groups, acylated urea groups and biuret groups.

Known polyisocyanates which are conventionally used in the production of lacquers are particularly suitable for the invention, for example modification products of the above-stated simple polyisocyanates containing biuret, isocyanurate or urethane groups, in particular tris-(6-isocyanatohexyl)biuret or low molecular weight polyisocyanates containing urethane groups, as may be obtained by reacting excess IPDI with simple polyhydric alcohols of the molecular weight range from 62 to 300, in particular with trimethylolpropane. Any desired mixtures of the stated polyisocyanates may, of course, also be used for the production of the products according to the invention.

Suitable polyisocyanates are moreover known prepolymers having terminal isocyanate groups, as are in particular obtainable by reacting the above-stated simple polyisocyanates, especially diisocyanates, with substoichiometric quantities of organic compounds having at least two groups capable of reacting with isocyanate groups. The compounds used are preferably those having a total of at least two amino groups and/or hydroxyl groups and a number average molecular weight of 300 to 10000, preferably of 400 to 6000.

In these known prepolymers, the ratio of isocyanate groups to NCO-reactive hydrogen atoms is 1.05 to 10:1, preferably 1.1 to 3:1, wherein the hydrogen atoms preferably originate from hydroxyl groups.

The nature and quantity ratios of the starting materials used in the production of NCO prepolymers are moreover preferably selected such that the NCO prepolymers have a) an average NCO functionality of 2 to 4, preferably of 2 to 3 and b) a number average molecular weight of 500 to 10000, preferably of 800 to 4000.

The polyisocyanates may be used as free polyisocyanates. In this case, they are not capped. In this case, the binders comprise so-called two-component systems (2-pack systems), in which the polyisocyanates are added immediately before application. If the isocyanate groups of the polyisocyanates are completely capped, the capped polyisocyanates may then be added directly to the coating composition. In this case, the coating compositions comprise so-called one-component systems (1-pack systems).

Conventional capping agents, as are for example used in the lacquer sector, may be used as the capping agent. Examples of usable capping agents are esters, such as malonic acid dimethyl ester, malonic acid diethyl ester, acetoacetic acid ethyl ester, lactams, such as ε-caprolactam, acetanilide, acetylacetone, acetone oxime, substituted pyrazoles, such as dimethylpyrazole, 1,2-propanediol and/or oximes, such as butanone oxime.

If uncapped, free polyisocyanates are used in aqueous systems, it may be advantageous to provide the polyisocyanates with hydrophilic or hydrophobic groups. The use of hydrophilic polyisocyanates facilitates the dispersion thereof in water. The introduction of hydrophobic groups accelerates the diffusion of the hydrophobised polyisocyanates into the resin particles in aqueous systems.

The binder composition according to the invention and thus the coating compositions according to the invention may contain one or more anhydride components F) as crosslinking agents which form ester groups with OH groups.

Component F) consists of at least one organic compound which has at least two cyclic carboxylic anhydride groups per molecule. The carboxylic anhydride group content of these compounds (formally calculated as $C_{43}$, molecular weight=96) is preferably 5 to 88 wt. %, particularly preferably 6 to 30 wt. %. Suitable compounds are, for example, trimellitic anhydride addition products of the general formula (I)

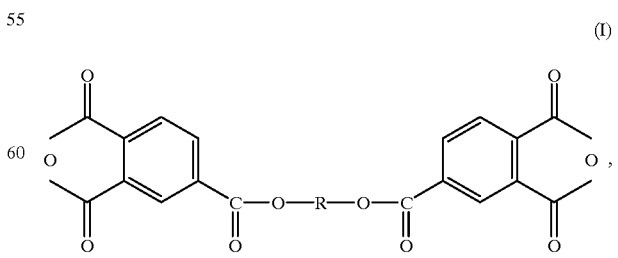

wherein R denotes a divalent hydrocarbon residue having 2 to 12 carbon atoms and optionally containing ether oxygen atoms. Compounds of the formula (I) which may be considered are, for example, the corresponding trimellitic anhydride esters of ethylene glycol, propylene glycol, diethylene glycol, triethylene glycol, neopentyl glycol, glycerol or trimethylolpropane.

Further suitable polyanhydrides are, for example, benzophenonetetracarboxylic dianhydrides of the general formula (II)

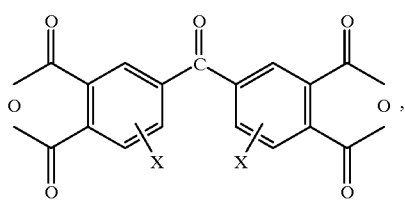

wherein X denotes hydrogen or halogen, $NO_2$, —COOH or —$SO_3H$ substituents and the two aromatic rings may be identical or different. Examples of these are 3,3',4,4'-benzophenononetetracarboxylic dianhydride; 2-bromo-3,3',4,4'-benzophenonetetracarboxylic dianhydride or 5-nitro-3,3',4,4'-benzophenonetetracarboxylic dianhydride.

A further suitable compound is, for example, also 1,2,4,5-benzenetetracarboxylic dianhydride of the formula (III)

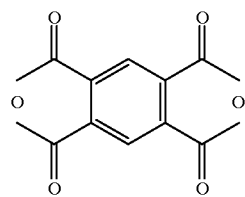

Component F) particularly preferably consists of copolymers of olefinically unsaturated monomers having on a statistical average at least two cyclic carboxylic anhydride groups per molecule. These preferably comprise copolymers of maleic anhydride and/or itaconic anhydride with comonomers such as are, for example, used as monomers in component A) and have already been disclosed above by way of example. Particularly suitable copolymers are those based on maleic anhydride, styrene and/or alkyl esters of acrylic and/or methacrylic acid. The copolymers preferably have a number average molecular weight (Mn) of 1500 to 75000, preferably of 2000 to 50000.

The production thereof may proceed completely analogously to the production of the copolymers A).

The binder composition according to the invention consists to an extent of at least 10 wt. % of one or more of components D), E) and/or F).

The binder composition according to the invention and thus the coating compositions according to the invention contain one or more monoepoxide compounds B). These comprise substances which are substantially non-volatile under stoving conditions, for example the volatile fraction preferably amounts to less than 1 wt. %, relative to the total quantity of monoepoxide B) in the binder composition. The molecular weights of the monoepoxides B) are above 150 and such compounds having a molecular weight of up to 3000 are preferred, particularly preferably of less than 1000. In the case of these low molecular weights, these compounds may have a very positive influence on the viscosity behaviour of the coating compositions produced therewith, as they then act, so to speak, as reactive diluents.

Examples of such compounds are, for example, reaction products prepared from 1 mol of a diglycidyl compound, for example a diglycidyl ether, such as bisphenol A diglycidyl ether, and 1 mol of a saturated or unsaturated monocarboxylic acid such as acetic acid, propionic acid or isononanoic acid. Further examples are reaction products of hydroxyalkyl epoxides, such as 1-hydroxy-2,3-epoxypropane, with aromatic polycarboxylic acids, such as phthalic or terephthalic acid, to yield the corresponding monoepoxy esters. Further examples are reaction products of di- or polyepoxides, such as for example polyglycidyl ethers based on diethylene glycol, dipropylene glycol, polypropylene glycol having a number average molecular weight of up to 2000 and triglycidyl ethers of glycerol and/or polyphenols, such as bisphenol A or F, with the stated monocarboxylic acids.

Component B) preferably comprises glycidyl esters of saturated C5–C10 monocarboxylic acids having tertiary carboxyl groups or mixtures thereof. These monocarboxylic acids are obtainable as a commercial product of Shell AG under the name versatic acids. The glycidyl ester of versatic acid known under the trade name Cardura E of Shell AG is particularly preferred.

The binder composition according to the invention and thus the coating compositions according to the invention may contain one or more catalysts (component G) for the reaction of carboxyl groups with epoxide groups. These in particular comprise catalysts soluble in organic solvents or in water or those miscible with organic materials. Examples of suitable catalysts soluble in organic solvents or miscible with organic materials are phosphonium salts, such as, such as for example ethyltriphenylphosphonium acetate, phosphate, chloride, bromide, iodide, butyltriphenylphosphonium acetate, phosphate, chloride, bromide, iodide, benzyltriphenylphosphonium acetate, phosphate, chloride, bromide, iodide and quaternary ammonium salts, such as for example alkylbenzyldimethylammonium chloride, benzyltrimethyl-ammonium chloride, methyltrioctylammonium chloride, tetraethylammonium bromide, N-dodecylpyridinium chloride and tetraethylammonium iodide.

Further examples of catalysts are acids, such as sulfonic acids, for example p-toluenesulfonic acid. It is also possible to react epoxide compounds with p-toluenesulfonic acid, for example at elevated temperature of up to, for example, 80° C. In this case, the p-toluenesulfonic acid is attached with oxirane opening. When the finished lacquer is stoved, the p-toluenesulfonic acid is dissociated and may catalyse the COOH/epoxide reaction with the formation of hydroxyl functions, wherein the latter may then react with the crosslinking groups. Further examples are dinonylnapthalenedisulfonic acid, dinonyl-naphthalenemonosulfonic acid and dodecylbenzenesulfonic acid. The acid catalysts may be partially, entirely or more than neutralised. Possible neutralising agents are tertiary amines, such as for example triethylamine, dimethylethanolamine or dimethyloxazolidine.

The catalyst soluble in organic solvents and/or water or miscible with organic materials may be used in a quantity of approximately 0 to approximately 10 wt. %, preferably of 0.3 to 2.0 wt. %, relative to the sum of weights of components A) to F).

It is also possible to link an amine catalyst to the COOH-functionalised (meth)acrylic copolymer resin mixture. This is conveniently achieved by copolymerising tert.-amino (meth)acrylic monomers during synthesis of the COOH-functionalised (meth)acrylic copolymer resin.

Examples of such monomers are dimethylaminoethyl (meth)-acrylate, diethylaminopropyl (meth)acrylate and dimethylaminopropyl (meth)acrylamide. The proportion by quantity of these (meth)acrylates is preferably from 0.5 to 10 wt. %, particularly preferably from 1 to 5 wt. %, relative to the total solids content of the COOH-functionalised (meth) acrylic copolymer resin.

When preparing the binder or coating composition according to the invention, quantity ratios are preferably selected such that, between the component A) resin containing carboxyl groups and the epoxy component B), there is a molar ratio of carboxyl groups to epoxide groups of 3:1 to 1:1 and that, between the sum of the weights of components A) to C) and the weight of the component D), in particular in the case of a melamine resin as component D), there prevails a ratio of 65:35 to 98:2, or between the sum of weights of components A) to C) and the weight of polyisocyanate component E) there prevails a ratio of 60:40 to 95:5.

Hydroxyl groups are formed by the reaction of the epoxide groups of B) with the carboxyl groups of A) which proceeds during stoving. These hydroxyl groups, together with the hydroxyl groups optionally present in A), give rise to a hydroxyl value of A) in the range from 80–250, preferably from 100–200, particularly preferably from 110–160 mg of KOH/g.

The binder compositions according to the invention may be used for the production of coating compositions. They may contain solvents as are conventional, for example, for the production of coating compositions, for example lacquers. The solvents may also comprise those as are used in the production of the individual components.

Examples of such solvents are organic solvents, in particular conventional lacquer solvents, such as aliphatic and aromatic hydrocarbons, for example toluene, xylene, mixtures of aliphatic and/or aromatic hydrocarbons, esters, ethers and alcohols. Aqueous solutions may also be prepared in order to produce coating compositions from the binders according to the invention. Suitable emulsifiers, as are conventional in the lacquer sector, may optionally be used for this purpose.

The binder compositions according to the invention, together with the coating compositions according to the invention, may also be in aqueous form, wherein they contain no or only a small proportion of organic solvents. In order to produce aqueous compositions, it is, for example, possible largely to eliminate organic solvents from component A) containing carboxyl groups, for example by distillation, and then to neutralise a proportion of the carboxyl groups, for example with bases such as triethyl-amine or dimethylethanolamine and then to emulsify them in water, which is optionally heated. The other resins may then optionally be emulsified into this emulsion, in which component A) acts as emulsifier resin. This is achieved, for example, by heating the emulsifier resin to 60–80° C. and stirring in the further resins, which have also been heated to 60–80° C., within 5 to 120 minutes. All other resins and lacquer additives may also be added before emulsification.

It is also possible, for example, to mix the component A) COOH-functionalised resin, from which solvents have largely or completely been removed, with the epoxide component B), from which the solvent has largely or completely been removed, and to emulsify them in a water/emulsifier mixture using a rotor/stator unit. It is also possible, for example, to emulsify the components separately and to mix the emulsions. Possible emulsifiers are, for example, ethoxylated sorbitan fatty acid esters.

In order to produce the coating compositions according to the invention, pigments, extenders and/or conventional lacquer auxiliary substances and additives may be added. These are conventional lacquer additives, as are usual in the lacquer sector.

Quantities are within the conventional ranges familiar to the person skilled in the art.

Examples of such additives are pigments, for example colouring pigments such as titanium dioxide or carbon black and effect pigments such as metal flake pigments and/or pearlescent pigments. The binder compositions prepared according to the invention are also suitable for coating compositions which contain such effect pigments. They preferably contain effect pigments together with colouring pigments or colouring pigments together with extenders. Further examples of additives are conventional lacquer extenders, such as for example talcum and silicates, together with auxiliary substances and additives such as plasticisers, light stabilisers, stabilisers and levelling agents, such as silicone oils. These are also used in conventional quantities familiar to the person skilled in the art.

The coating compositions produced from the binders according to the invention are suitable for coatings which adhere to many substrates, such as for example wood, textiles, plastics, glass, ceramics and in particular metal.

The coating compositions according to the invention may be applied using known methods, such as for example spraying, dipping, roller or knife application. The coat of the coating composition according to the invention is here applied, for example as a topcoat lacquer coating, onto the substrate, which has optionally already been provided with further lacquer layers. After a flashing off phase, the applied coating composition is crosslinked by heating. Stoving temperatures are from 80 to 180° C., preferably from 100 to 150° C. The thickness of the stoved film is approximately 15 to 60 $\mu$m. The resultant crosslinked lacquer coating is hard, glossy and acid-resistant.

A preferred embodiment is the application of the coating composition according to the invention as a clear lacquer coating onto a base lacquer, preferably an aqueous base lacquer, containing colouring and/or effect pigment. The lacquer may be applied wet-on-wet or the base lacquer is previously dried by heating. In this manner, particularly good adhesion of the two layers is achieved.

Base lacquers which may contain conventional topcoat lacquer pigments may, for example, be overcoated with the coating compositions according to the invention formulated without pigments as clear lacquers; the base lacquers preferably contain effect pigments, such as for example metallic pigments. The base lacquer binder is preferably based on polyester, polyurethane or (meth)acrylic copolymer resins. These binders may optionally be crosslinked with crosslinking agents, for example melamine or isocyanate derivatives.

It is also possible to heat the coating composition according to the invention, in particular that formulated as a clear lacquer, and to apply it while hot, for example at 60 to 100° C. In this manner, the coating composition may be applied at a very high working solids content since heating reduces the viscosity.

It is also possible to combine the coating composition according to the invention, in particular as a clear lacquer, with supercritical carbon dioxide as lacquer solvent and to apply it using the so-called Unicarb process.

The coating compositions according to the invention may be formulated as base lacquers and also as surfacers, in addition to being formulated as a clear lacquer. They are then particularly well suited for the production of multi-layer lacquer coatings, for example in the automotive sector. Conventional additives, as were for example described above for base lacquers, may be added when preparing base lacquer or surfacer formulations.

In a preferred embodiment, the coating compositions containing the binder compositions according to the invention are used as a base lacquer and/or clear lacquer in a process for the production of a multilayer lacquer coating, wherein the multilayer lacquer coating is produced by applying a primer and optionally one or more further interlayers onto a substrate and subsequently applying a base lacquer containing colouring and/or effect pigments with subsequent overcoating with a clear lacquer, wherein the base lacquer and clear lacquer may be applied wet-on-wet and be staved together.

In comparison with conventional base lacquers, the base lacquers according to the invention in particular give rise to coatings having improved resistance to warm, humid conditions.

The base lacquers according to the invention may be overcoated wet-on-wet, optionally after short preliminary drying, with conventional clear lacquers. They are preferably overcoated with clear lacquers based on the coating compositions according to the invention.

DETAILED DESCRIPTION OF THE PREFERRED EMBODIMENT

In the following Examples, unless otherwise stated, parts and percentages relate to weight.

EXAMPLE 1

Production of an Acidic Polyester 843.8 parts of isononanoic acid, 845.5 parts of hexahydrophthalic anhydride and 808.3 parts of pentaerythritol are initially introduced with stirring into a three-necked flask which is provided with a stirrer, separator, thermometer and reflux condenser and esterified at 180° C. to 230° C. until an acid value of approx. 30 mg of KOH/g is achieved. The temperature is reduced to 80° C. and 1274 parts of hexahydrophthalic anhydride are then added in portions. The temperature must not exceed 100° C. during addition. After addition, the temperature is increased to 140° C. and the mixture stirred for 2 hours at this temperature. The batch is then cooled to 80° C. and diluted with 895 parts of n-butanol. The resultant polyester has a stoving residue of 79.8% (1h/150° C.) and an acid value of 155 mg of KOH/g of solid resin.

EXAMPLE 2

Production of a COOH-functional Acrylic Resin 808 parts of ethylene glycol monobutyl ether acetate are initially introduced into a four-necked flask which is provided with a stirrer, reflux condenser, dropping funnel and thermometer and heated to 145° C. while being stirred. A mixture prepared from 274 parts of acrylic acid, 404 parts of styrene, 587 parts of butyl methacrylate, 565 parts of butyl acetate, 11 parts of di-tert.-butyl peroxide and 48 parts of tert.-butylperoxy-2-ethylhexanoate is then apportioned continuously over a period of 5 hours. The mixture is then post-polymerised for 4 hours at 145° C. The resultant polymer has a stoving residue of 70.3% (1 h/150° C.) and an acid value of 118 mg of KOH/g of solid resin.

EXAMPLE 3

Production of Lacquers 445 parts of the polyester produced in Example 1) are mixed with 257 parts of the glycidyl ester of versatic acid (commercial product of Shell, Cardura E), 152 parts of a conventional commercial hexamethoxymelamine resin, 3 parts of a conventional commercial silicone-based levelling agent and 239 parts of a mixture of aromatic hydrocarbons. The resultant lacquer has a stoving residue of 69.5% (1 h/125° C.). A spraying viscosity is then established with n-butanol.

The lacquer is then applied wet-on-wet onto a metal sheet, which is coated with a conventional commercial aqueous base lacquer. To this end, the base lacquer is first applied to a dry film thickness of approx. 15 $\mu$m with a spray gun, flashed off for 5 minutes and then predried for 10 minutes at 80° C. The clear lacquer according to the invention from Example 3) is then applied by spraying to a dry film thickness of approx. 35 $\mu$m and stoved for 25 minutes at 145° C.

The resultant lacquer exhibits excellent topcoat lacquer qualities and very good resistance to chemicals, such as for example acids.

EXAMPLE 4

Production of Lacquers 500 parts of the polyacrylate resin described in Example 2) are mixed with 188 parts of Cardura E 10, 3 parts of a conventional commercial silicone-based levelling agent, 152 arts of a conventional commercial hexamethoxymelamine resin, 100 parts of a mixture of aromatic hydrocarbons, as well as 28 parts of n-butanol. The resultant lacquer has a stoving residue of 70% (1 h/125° C.). The lacquer is adjusted to spraying viscosity with n-butanol. The lacquer is applied wet-on-wet as described in Example 3), except that the clear lacquer from Example 4) is used in this case. The resultant stoved lacquer is also distinguished by very good topcoat lacquer properties and very good acid resistance.

EXAMPLE 5

Production of Lacquers

The same method is used as in Example 4), except that in this case 12 parts of p-toluenesulfonic acid are additionally added as catalyst. This lacquer is also distinguished, once stoved, by very good topcoat lacquer properties and good acid resistance, but the lacquer film is more resistant to scratching than in Examples 3) and 4).

What is claimed is:

1. Binder composition suitable for coating compositions, comprising

A) 30 to 80 wt. % of one or more carboxy-functional polymers, the carboxyl functionality of which in each case corresponds to an acid value of 15 to 300 mg of KOH/g, B) 3 to 30 wt. % of one or more low molecular weight monoepoxides having an average molecular weight of above 150 and less than 1000, said monoepoxides comprise glycidyl esters of saturated C5–C10 monocarboxylic acids having tertiary carboxyl groups or mixtures thereof, C) 0 to 60 wt. % of one or more polyols having at least two hydroxyl functions in the molecule, which differs from a component A) optionally containing hydroxyl functionality, D) 0 to 40 wt. % of components which crosslink with hydroxyl groups to form esters and/or a triazine-based crosslinking agent, E) 0 to 40 wt. % of one or more polyisocyanates, which may optionally be capped, F) 0 to 60 wt. % of an anhydride component consisting of at least one organic polyanhydride having at least two cyclic carboxylic anhydride groups per molecule, G) 0 to 10 wt. % of one or more catalysts for catalyzing the reaction of carboxyl and epoxide groups, wherein the sum of weight percentages of components A) to G) is 100 wt. % and wherein at least 10 wt. % of the binder composition consists of one or more of components D), E), and/or F).

2. Binder composition according to claim 1, characterised in that between the sum of weights of components A) to C) and the weight of component D) there prevails a ratio of 65:35 to 98:2 or between the sum of weights of components A) to C) and the weight of component E) there prevails a ratio of 60:40 to 95:5.

3. Binder composition according to claim 1, characterised in that it contains as component A) one or more carboxy-functional polymers, the carboxyl groups of which are at least partially reacted with lactone.

4. Binder composition according to claim 1, characterized in that component A) has a glass transition temperature of −20 to 50° C.

5. coating composition, characterised in that it contains a binder combination according to claim 1.

6. coating composition according to claim 5, characterised in that it comprises an aqueous or solvent-containing coating composition.

7. Process for the production of multilayer lacquer coatings by applying a primer and optionally one or more further interlayers onto a substrate and subsequently applying a base lacquer containing colouring and/or effect pigments with subsequent overcoating with a clear lacquer, wherein the base lacquer and clear lacquer may be applied wet-on-wet and be stoved together, characterised in that the base lacquer and/or clear lacquer used is a coating composition according to claim 6 or a binder according to claim 1.

8. Binder composition according to claim 4, characterised in that component A) has a glass transition temperature of 0 to 35° C.

* * * * *

UNITED STATES PATENT AND TRADEMARK OFFICE
CERTIFICATE OF CORRECTION

PATENT NO.     : 6,258,874 B1
DATED          : July 10, 2001
INVENTOR(S)    : Duecoffre et al.

It is certified that error appears in the above-identified patent and that said Letters Patent is hereby corrected as shown below:

Column 3,
Line 19, change "$\alpha$-caprolactone" to -- $\varepsilon$-caprolactone --.

Column 4,
Line 64, change "80C" to -- 80° C --.

Column 8,
Line 49, change "$C_{43}$" to -- $C_4O_3$ --.

Column 13,
Line 13, change "staved" to -- stoved --.

Column 14,
Line 27, change "arts" to -- parts --.
Line 66, change "esters" to -- ethers --.

Signed and Sealed this

Twenty-sixth Day of February, 2002

*Attest:*

*Attesting Officer*

JAMES E. ROGAN
*Director of the United States Patent and Trademark Office*